United States Patent
Zhu et al.

(10) Patent No.: US 8,401,595 B2
(45) Date of Patent: Mar. 19, 2013

(54) METHOD AND SYSTEM FOR INTEGRATED WIRELESS POWER AND DATA COMMUNICATION

(75) Inventors: Chunhui Zhu, San Jose, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 906 days.

(21) Appl. No.: 12/490,222

(22) Filed: Jun. 23, 2009

(65) Prior Publication Data

US 2010/0142509 A1   Jun. 10, 2010

Related U.S. Application Data

(63) Continuation-in-part of application No. 12/329,786, filed on Dec. 8, 2008.

(51) Int. Cl.
*H04B 1/00* (2006.01)
(52) U.S. Cl. ............ 455/574; 455/573; 455/127.1; 455/67.11; 455/69; 370/235; 370/311; 370/343; 320/137; 307/66; 713/320
(58) Field of Classification Search .......... 455/574, 455/522, 572, 573, 127.1, 67.11, 69, 41.2; 370/235, 310, 311, 318, 343; 320/137; 307/66; 713/320
See application file for complete search history.

(56) References Cited

U.S. PATENT DOCUMENTS

| | | | |
|---|---|---|---|
| 6,127,799 A | 10/2000 | Krishnan | |
| 6,876,866 B1 | 4/2005 | Ulupinar et al. | |
| 7,054,296 B1 | 5/2006 | Sorrells et al. | |
| 7,084,605 B2 | 8/2006 | Mickle et al. | |
| 7,917,093 B2* | 3/2011 | Takei | 455/67.11 |
| 2002/0044549 A1 | 4/2002 | Johansson et al. | |
| 2007/0058575 A1 | 3/2007 | Kwon et al. | |
| 2008/0056133 A1* | 3/2008 | Deshpande et al. | 370/235 |
| 2008/0132206 A1 | 6/2008 | Suzuki | |
| 2008/0176521 A1 | 7/2008 | Singh et al. | |
| 2010/0036773 A1* | 2/2010 | Bennett | 705/67 |
| 2010/0142423 A1 | 6/2010 | Zhu et al. | |

FOREIGN PATENT DOCUMENTS

| | | | |
|---|---|---|---|
| JP | 2002531002 A | 9/2002 | |
| JP | 2006197161 A | 7/2006 | |

OTHER PUBLICATIONS

Notification of Transmittal of The International Search Authority, International Search Report, and The Written Opinion dated Jun. 23, 2010 for International Application No. PCT/KR2009/006469 from Korean Intellectual Property Office, filed Nov. 5, 2009, pp. 1-12, Seo-gu, Daejeon, Republic of Korea.

Xue, P. et al., "Enhanced IEEE 802.15.3 MAC Protocol for Efficient Support of Multiple Simultaneously Operating Piconets," IEEE Transactions on Vehicular Technology, Jul. 2008, pp. 2548-2559, vol. 57, No. 4, IEEE, United States.

(Continued)

*Primary Examiner* — Shaima Q Aminzay
(74) *Attorney, Agent, or Firm* — Kenneth L. Sherman, Esq.; Michael Zarrabian, Esq.; Sherman & Zarrabian LLP

(57) ABSTRACT

A method and system of integrated wireless power and data transmission in a wireless device having a data communication circuit for wireless data communication and a power reception circuit including a charge storage unit. The wireless device is tuned to receive wireless RF signals in a certain frequency band via an antenna. Switching between power reception mode and data communication mode is detected. Received RF signal electrical charge is selectively distributed to the power reception circuit and/or the data communication circuit based on the switching mode and/or strength of the RF signal.

31 Claims, 9 Drawing Sheets

OTHER PUBLICATIONS

U.S. Non-Final Office Action for U.S. Appl. No. 12/329,786 mailed Oct. 11, 2011.

Ward, M. et al, "RFID: Frequency, standards, adoption and innovation," JISC Technology and Standards Watch, May 2006, JISC TechWatch, 2006, pp. 1-36, United Kingdom.

IEEE Computer Society, "802.15.4™ IEEE Standard for Information Technology—Telecommunications and Information Exchange between Systems—Local and Metropolitan Area Networks—Specific Requirements, Part 15.4: Wireless Medium Access Control (MAC) and Physical Layer (PHY) Specifications for Low-Rate Wireless Personal Area Networks (LR-WPANs)," Oct. 1, 2003, pp. 10, 13-36, 33, 109-111, and 161, IEEE, New York, United States.

U.S. Notice of Allowance for U.S. Appl. No. 12/329,786 mailed Feb. 6, 2012.

\* cited by examiner

9

METHOD AND SYSTEM FOR INTEGRATED WIRELESS POWER AND DATA COMMUNICATION

RELATED APPLICATIONS

This application is a continuation-in-part, and claims the benefit under 35 U.S.C. §120, of U.S. patent application Ser. No. 12/329,786 filed on Dec. 8, 2008, incorporated herein by reference.

FIELD OF THE INVENTION

The invention relates generally to power transmission, and in particular, to power and data communication to the same device via radio frequency (RF) radiation.

BACKGROUND OF THE INVENTION

With the proliferation of mobile electronic devices, many wireless devices are necessarily powered by batteries. For example, devices in wireless local area network (WLAN) or wireless personal area network (WPAN) mesh networks are battery powered. In such networks, the number of nodes may be very large. One of the technical challenges for sustaining wireless mesh networks is maintaining batteries for hundreds, or even thousands, of nodes in a network. Current battery technology requires the battery of a wireless sensor node to be changed every several days or at most every several months. This is an obstacle for widespread adoption of wireless mesh networks.

BRIEF SUMMARY OF THE INVENTION

A method and system of integrated wireless power and data transmission in a wireless device having a data communication circuit for wireless data communication and a power reception circuit including a charge storage unit. In one embodiment, the wireless device is tuned to receive wireless RF signals in a certain frequency band via an antenna. Switching between power reception mode and data communication mode is detected. Received RF signal electrical charge is selectively distributed to the power reception circuit and/or the data communication circuit based on the switching mode and/or strength of the RF signal.

Selectively distributing received RF signal electrical charge may further comprise, in power reception mode distributing received RF signal electrical charge to the power reception circuit only to charge the charge storage unit.

Selectively distributing received RF signal electrical charge may further comprises, in data communication mode, determining strength of the RF signal, and if the RF signal strength is less than a threshold, then distributing the RF signal electrical charge to the data communication circuit only to operate the data communication circuit.

Selectively distributing received RF signal electrical charge in data communication mode may further comprise, if the RF signal strength is greater than a threshold, then splitting distribution of the RF signal electrical charge between the data communication circuit and the power reception circuit. In data communication mode splitting distribution of the RF signal electrical charge may further comprise splitting distribution of the RF signal electrical charge between the data communication circuit and the power reception circuit such that received RF signal electrical charge in excess of data communication circuit operational needs is distributed to the power reception circuit to charge the charge storage unit.

The process may further include generating control signals for switching the wireless device between a power reception mode and a data communication mode, the control signals providing switching information including information about which of the modes to switch to, and information about timing of the switching. In the data communication mode, the wireless device processes an RF transmission from a sending wireless device as a data communication, and in the power reception mode the receiving wireless device processes the RF transmission as energy radiation.

These and other features, aspects and advantages of the present invention will become understood with reference to the following description, appended claims and accompanying figures.

DETAILED DESCRIPTION OF THE INVENTION

The invention provides a method and system for integrated wireless power and data communication control. One embodiment involves transmitting electrical charge to a charge storage unit of a device, and information delivery to the same device, using radio frequency (RF) radiation. Electrical charge is delivered to a charge storage unit of a wireless device and information is delivered to the wireless communication unit of the wireless device, all using RF radiation signal. The RF signal is selectively and adaptively split into the respective power (charge storage) and data (wireless communication) circuits of the wireless device.

The wireless power transmission and the information delivery are accomplished in the same frequency band or different frequency bands, using a single, common antenna, for a wireless electronic device. This enables devices in a wireless network to switch between a power receiving mode and a data communication (transmission/reception) mode, depending on whether they are involved in data communication.

Figure 1:
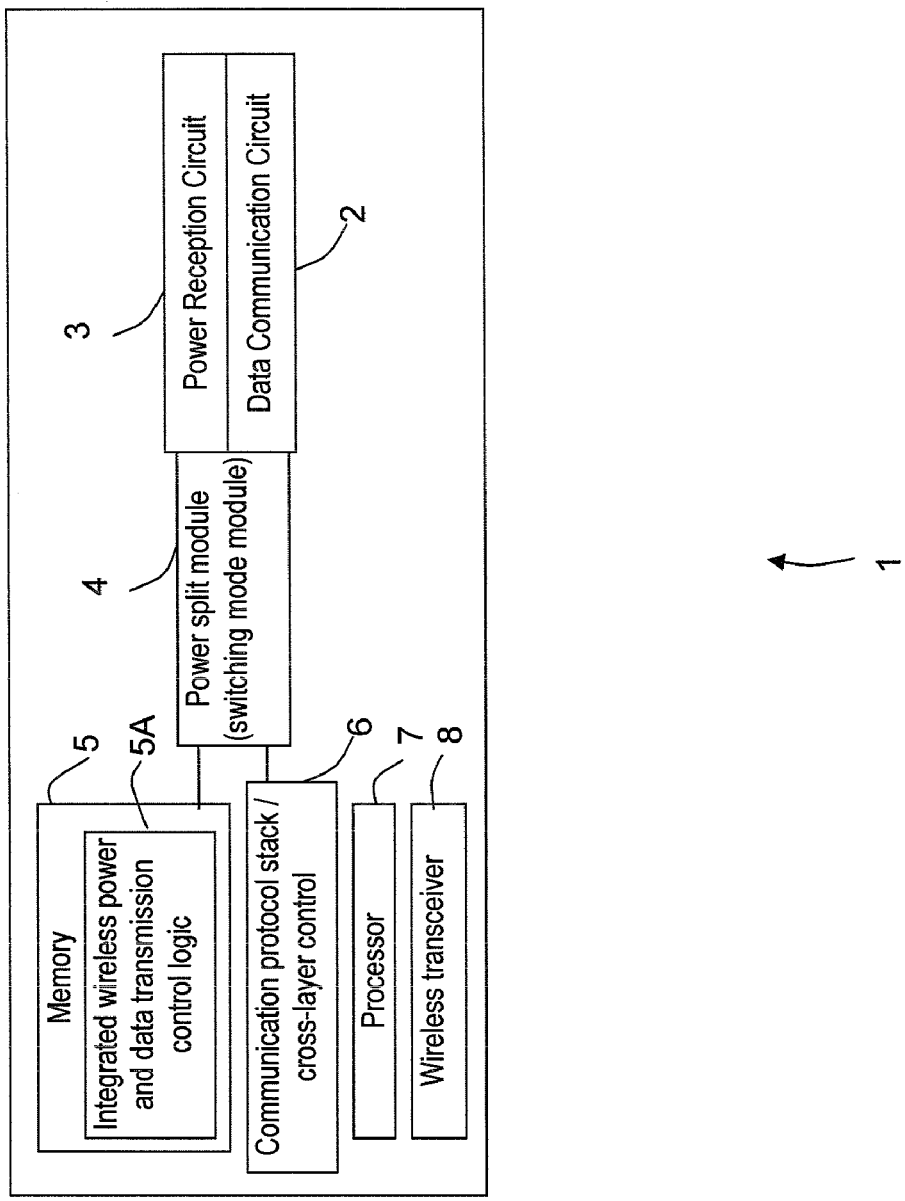
FIG. 1 shows a functional block diagram of a wireless device implementing selectively and adaptively distributing electrical charge from received radio frequency (RF) radiation, to a charge storage unit of the wireless device, and/or data receiving circuit in the wireless device, according to an embodiment of the invention.

FIG. 1 shows a functional block diagram of a wireless station device 1 according to an embodiment of the invention. The wireless station device 1 includes a data communication circuit (e.g., data reception circuit) 2, a power communication circuit (e.g., power reception circuit) 3 and a power split module 4 configured for selectively and adaptively splitting incoming RF signals into the data communication circuit 2 and/or the power circuit 3. The wireless station device 1 further includes communication protocol stack and cross-layer control module 6 which control switching of the wireless station device 1 between power receiving and data communication modes (switching modes) via a power split and switching module 4. The wireless station device 1 further includes a memory device 5 including integrated wireless power and data communication logic that controls the power split and switching module 4 for selectively and adaptively distributing/splitting incoming RF signals into the data communication circuit 2 and/or the power reception circuit 3. A processor 7 executes code instructions from memory 5 and a wireless transceiver 8 enables RF communications.

One embodiment of a process for integrated wireless power and data communication involves generating control signals for switching the wireless device between a power reception mode and a data reception mode. The control signals provide switching information including information about which of the modes to switch to, and information about timing of the switching.

The receiving wireless devices tunes to receive wireless RF signals in a certain frequency band via an antenna, and determines characteristics of the RF signal. In the power reception mode, the receiving wireless device processes an incoming RF transmission from a sending wireless station as energy radiation wherein the received RF signal is pure power transmission and contains no data. Specifically, the RF splitting module distributes the received RF radiation energy only to the power reception circuit of the wireless device to charge the charge storage unit therein.

In the data reception mode, the receiving wireless device processes an incoming RF transmission from a sending wireless station as a data communication. In the data reception mode, selecting distribution of received RF power is adaptive based on the strength of the received RF signal and power needs/sensitivity of the data reception circuit of the receiving wireless device. When the received RF data signal is sufficiently strong (e.g., above a selected threshold based on sensitivity of the data reception circuit), the RF splitting module may distribute the received RF radiation energy between the power reception circuit and the data reception circuit (received RF power in excess of data reception circuit operation needs may be used to charge the charge storage unit). When the received RF data signal is not sufficiently strong (e.g., below a selected threshold based on sensitivity of the data reception circuit), the RF splitting module distributes the received RF radiation energy to the data reception circuit only.

The invention provides selective and adaptive charging by employing the electromagnetic field (i.e., radio waves) in RF transmission. The transmission range is based on the transmission power, which is greater than that in an RFID system (RFID uses induction whereas the invention uses radio waves for RF transmission of the power). The invention provides continuous or periodic charging, wherein a wireless device can be charged whenever there is no data packet is in an RF transmission.

Selecting distribution of received RF power is adaptive based on the strength of the received RF signal and power needs/sensitivity of the data reception circuit for operation. When the RF data signal is very strong (e.g., above a selected threshold based on sensitivity of the data reception circuit), the RF splitter may distribute the received energy between the power reception circuit and the data reception circuit. Received RF power in excess of data reception circuit operation needs may be used to charge the charge storage unit.

Figure 2:
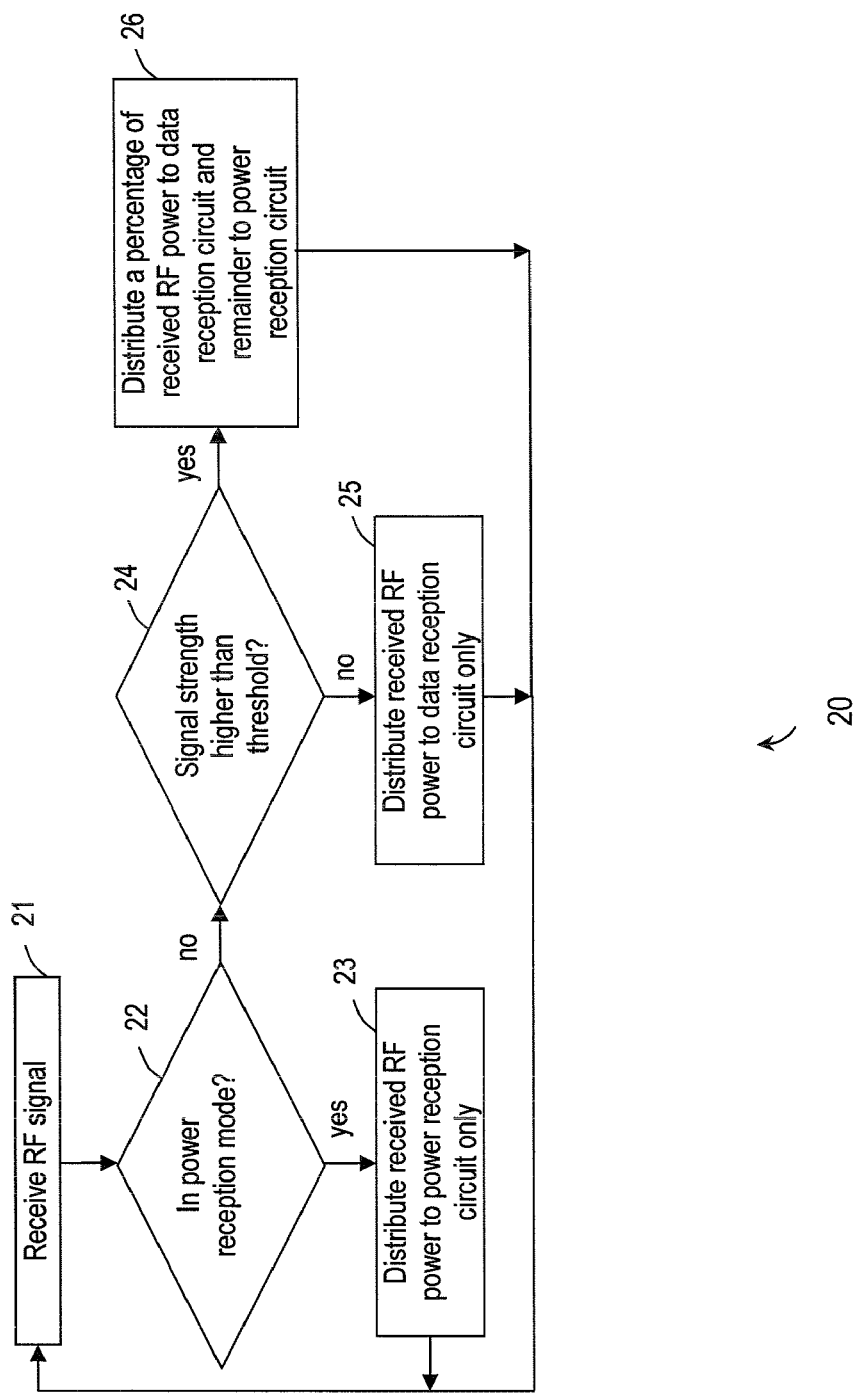
FIG. 2 shows a process for selectively and adaptively distributing electrical charge from received radio frequency (RF) radiation to a charge storage unit of a wireless device, and/or data receiving circuit in the wireless device, according to an embodiment of the invention.

FIG. 2 shows a flowchart of a process 20 for integrated wireless power and data communication, according to an embodiment of the invention, comprising the following process blocks:

Block 21: Receive RF signal.
Block 22: If in power reception mode, the received RF signal is pure power transmission and contains no data. If yes, proceed to block 23, else proceed to block 24 for data communication mode.
Block 23: Power split module distributes the RF signal to the power reception circuit only. Proceed to block 21.
Block 24: In data communication mode (e.g., data reception mode) the received RF signal contains data. Is the RF signal strength higher than a preset threshold? If not, proceed to block 25 else proceed to block 26.
Block 25: Power split module distributes the RF signal to the data reception circuit only. Proceed to block 21.
Block 26: Power split module distributes a certain percentage of the received RF power to the data reception circuit and distributes the remainder to the power reception circuit. The preset threshold is preferably set to the power level at which the data can be received error-free (the receiver sensitivity is a good indication). When the received power level is higher than the present threshold, the RF energy above the threshold (excess power) may be used to charge an energy storage device (e.g., battery) in the power reception circuit. Proceed to block 21.

One implementation of said control signals for switching the receiving wireless device between data communication and power reception modes involves cross-layer control process that allows both wireless communication and power transmission using a single, common antenna. As noted, one implementation of said control signals for switching the receiving wireless device between data communication and power reception modes involves cross-layer control process that allows both wireless communication and power transmission using a single, common antenna. In one example star communication network, a coordinator station (or master device) is the power transmitter as well as the central controller of the communication network. Beacon frames transmitted by the coordinator are utilized by the receiving wireless device in the network to control the timing of switching between power receiving mode and data communication mode. In a mesh network, because there is no coordinator/master device, the wireless device in the network is charged by data transmissions occurring in its neighborhood and/or other devices scattered in the network. Said control signals enable the receiving wireless device in a network to determine when to switch modes (between power receiving mode and data communication mode), and which mode to switch to. This allows the receiving wireless device to avoid conflict between energy reception and data communication, and to thereby avoid missing data messages from other devices.

This provides charging the rechargeable batteries of wireless device (wireless node) in a star or mesh topology network. The wireless device may recharge its batteries by receiving power transmission from the coordinator or master device in a star network, or overhearing (receiving) data transmissions among other wireless nodes in a mesh network.

Examples implementations of star topology include WLAN Access Point (or Wireless Router) and WLAN devices, Piconet Coordinator of a WPAN network and devices, Bluetooth master and slave devices. The terms "coordinator" or "master device" are used to designate a central controller, and the terms "slave device" or "simply device" are used to designate the devices 11 in the star network which are not the central controller.

In a star network, beacon frames from a coordinator are used to control the timing of switching between the data communication and power transmission modes at a wireless node in the network. In a mesh network, a RTS/CTS (Request To Send/Clear To Send) protocol may be utilized to establish the timing for switching between the two modes. Further, an inter-frame guard time maybe implemented as a power inter-frame space (PIFS), to allow mains powered devices to charge battery powered devices in mesh networks. This is described in more detail further below in relation to FIG. 8.

Figure 3:
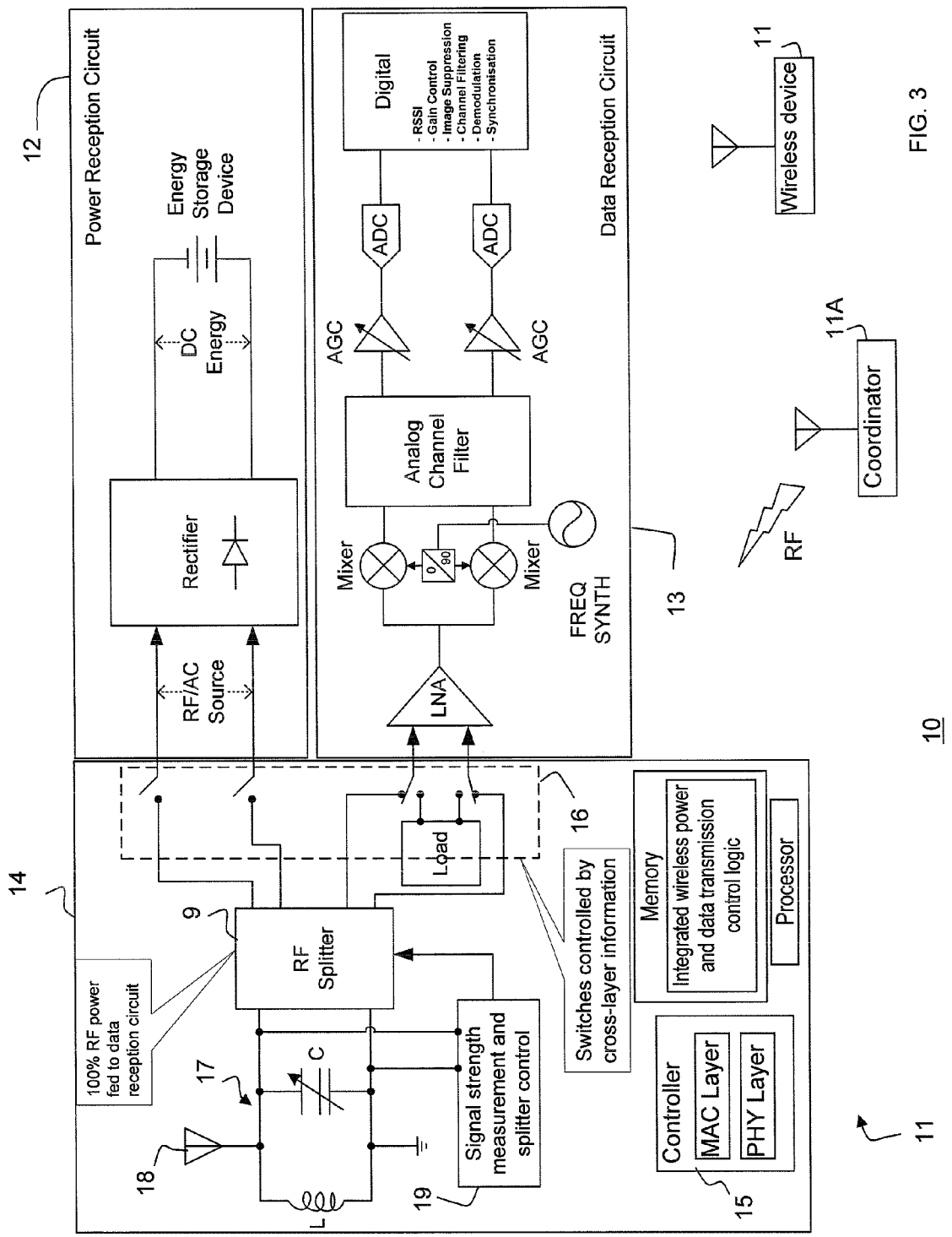
FIG. 3 shows a functional block diagram of a wireless device implementing selectively and adaptively distributing electrical charge from received radio frequency (RF) to a data receiving circuit in the wireless device, according to an embodiment of the invention.

FIG. 3 shows an example communication system 10 including a wireless node 11. The wireless node 11 is an implementation of the wireless station 1 in FIG. 1 which embodies the process 20. Referring to FIG. 3, the wireless node comprises a power reception circuit 12, a data reception circuit 13 and an interface 14 (including a Radio Frequency (RF) front end circuit) that switches modes between the power reception circuit and the data reception circuit based on a control signal generated by a controller 15 in the station, according to an embodiment of the present invention. The interface 14 can switch to the power reception mode whenever possible and without negatively affecting data communication. In the example shown in FIG. 1, the interface 14 comprises a switch module 16 that is in the data reception mode, wherein all the received RF power is fed to the data reception circuit 13.

In this embodiment, the controller 15 determines when to switch between data communication and energy (power) reception. In one embodiment, the MAC layer of a wireless station which functions as the controller 15, generates said control signals for switching between power reception and data communication mode (e.g., data reception mode), and the PHY layer of the wireless station functions as a communication module for RF communication. The control signal is generated at the MAC layer and provided to the PHY layer (i.e., cross-layer control) for power mode switching.

In one implementation, MAC layers in nearby wireless stations (nodes) cooperatively determine which node pairs may use a shared communication media (e.g., communication channel) at a given time period. According to an embodiment of the invention, when a node is prohibited from transmitting or receiving data during a time period, then it may switch to power reception mode without affecting data communication. In the following, examples of mode switching are described for nodes in star and mesh (peer-to-peer) topologies, according to embodiments of the present invention.

The wireless node 11 is capable of receiving energy from wireless/RF power transmitters, and is further capable of transmitting/receiving data messages in the same or different wireless/RF frequency band. The wireless node 11 can switch between the power reception and data communication modes. The wireless node 11 employs an RF splitter, wherein in data communication mode the RF splitter shares RF power between data reception and power reception circuits if the RF signal of data communication is much stronger than necessary for proper data reception. Having separate circuits for data and power reception allows the amount of power received to be essentially maximized, and one of the two circuits that is not in operation can be powered off to save energy. The same antenna may be used for both data communication and power reception.

In one example, based on control signals by the controller 15 from the cross-layer information, and based on the signal strength measurement and control module 19, the switches 16 control the connections between the outputs from the RF splitter 9 and the data/power reception circuits 12, 13. The cross-layer information (i.e., power reception mode and data transmission mode) is provided by the upper layers of a communication protocol stack (e.g., MAC, PHY of controller 15) so that the switches 16 can be controlled by such upper layer protocols as described. The RF splitter 9 distributes received RF power to its outputs based on control signals from the signal strength measurement and control module 19 and the controller 15.

An LC circuit 17 (including inductor L and variable capacitor C) functions as a tuning circuit to receive wireless power transmission signals (RF signals) and data communication signals in a certain frequency band via an antenna 18. The LC circuit 17 outputs electrical charge corresponding to the strength or the received RF signal. The RF signal strength (RF charge or RF power strength) is then measured by a signal strength measurement and control module 19, which controls an RF splitter 9. The signal strength measurement and control module 19 determines characteristics of the RF signal, such as signal strength.

Based on control signals from module 19, the RF splitter 9 may split the RF power to two different outputs, one to the power reception circuit 12 and the other to the data reception circuit 13. As such, in data transmission mode, the received RF signal is selectively and adaptively split into the respective power and data circuits 12, 13. The distribution (percentage) of the RF power between the two outputs from the RF splitter 9 is adjustable based on control signals from the signal strength measurement and control module 19. Depending on the switching mode and the strength of the received RF signal, the signal strength measurement and control module 19 can selectively:

1. In power reception mode, distribute 100% of the RF power to the power reception circuit 12, or
2. In data reception mode, distribute 100% of the RF power to the data reception circuit 13, or share the RF power between the two circuits 12, 13, at a certain ratio.

In general, under control of the signal strength measurement and control module 19, when the received RF signal is pure power transmission and contains no data (i.e., in power reception mode), the RF splitter 9 feeds the RF signal to the power reception circuit 12 only.

When the received RF signal contains data (i.e., in data transition mode) but the signal strength is not higher than a preset threshold, the RF splitter 9 feeds the RF signal to the data reception circuit 13 only. When the received RF signal contains data (i.e., in data transition mode) and the signal strength is higher than a preset threshold, the RF splitter 9 distributes a certain percentage of the received RF power to the data reception circuit 13 and distribute the remainder to the power reception circuit 12.

The preset threshold is preferably set to the power level at which the data can be received error-free (the receiver sensitivity is a good indication). When the received power level is higher than the present threshold, the RF energy above the threshold may be used to charge the Energy Storage Device in the power reception circuit 12.

FIG. 3 illustrates the case wherein switch 16 is controlled by the controller 15 cross-layer information to be in data transition mode, and the RF splitter 9 is controlled by the signal strength measurement and control module 19 to cause 100% of received RF power to be distributed to the data reception circuit 13. In this example, received RF signal is of insufficient strength for sharing with the power reception circuit 12 while maintain data reception accuracy in the data reception circuit 13. In this case, the power reception circuit 12 can be powered off (e.g., by the controller 15) to conserve power.

Figure 4:
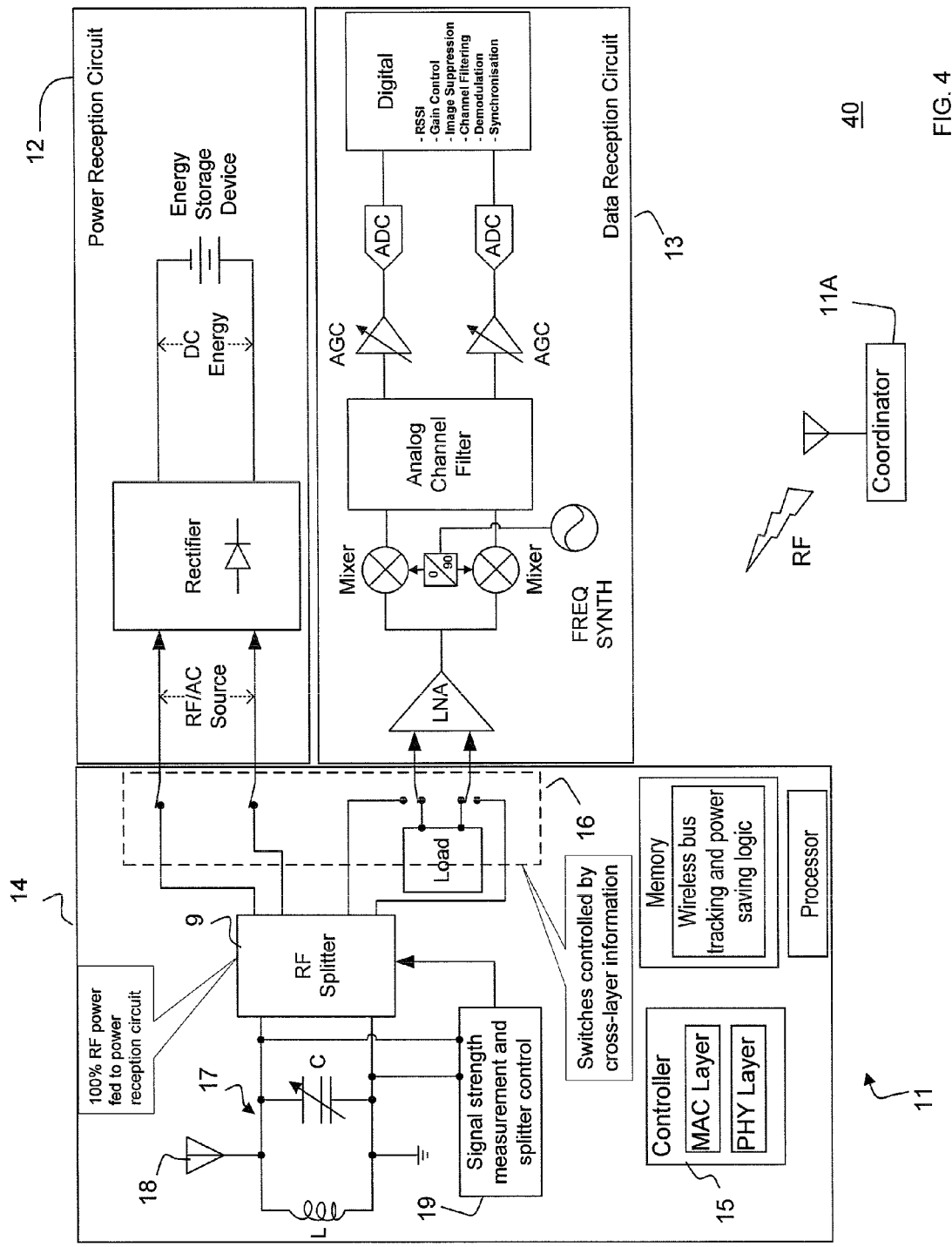
FIG. 4 shows a functional block diagram of a wireless device implementing selectively and adaptively distributing electrical charge from received radio frequency (RF) radiation to a charge storage unit in a power receiving circuit of the wireless device, using received radio frequency (RF) radiation, according to an embodiment of the invention.

FIG. 4 shows an example communication system 40 including a wireless node 11 wherein switch 16 is controlled by the cross-layer information to be in power reception mode, and the RF splitter 9 is controlled by the signal strength measurement and control module 19 to cause 100% of received RF power to be distributed to the power reception circuit 12. A low noise amplifier (LNA) in the data reception circuit 13 is connected to a Load to prevent receiving irrelevant signals. When appropriate, the entire data reception circuit 13 can be powered off (e.g., by the controller 15) to conserve power.

Figure 5:
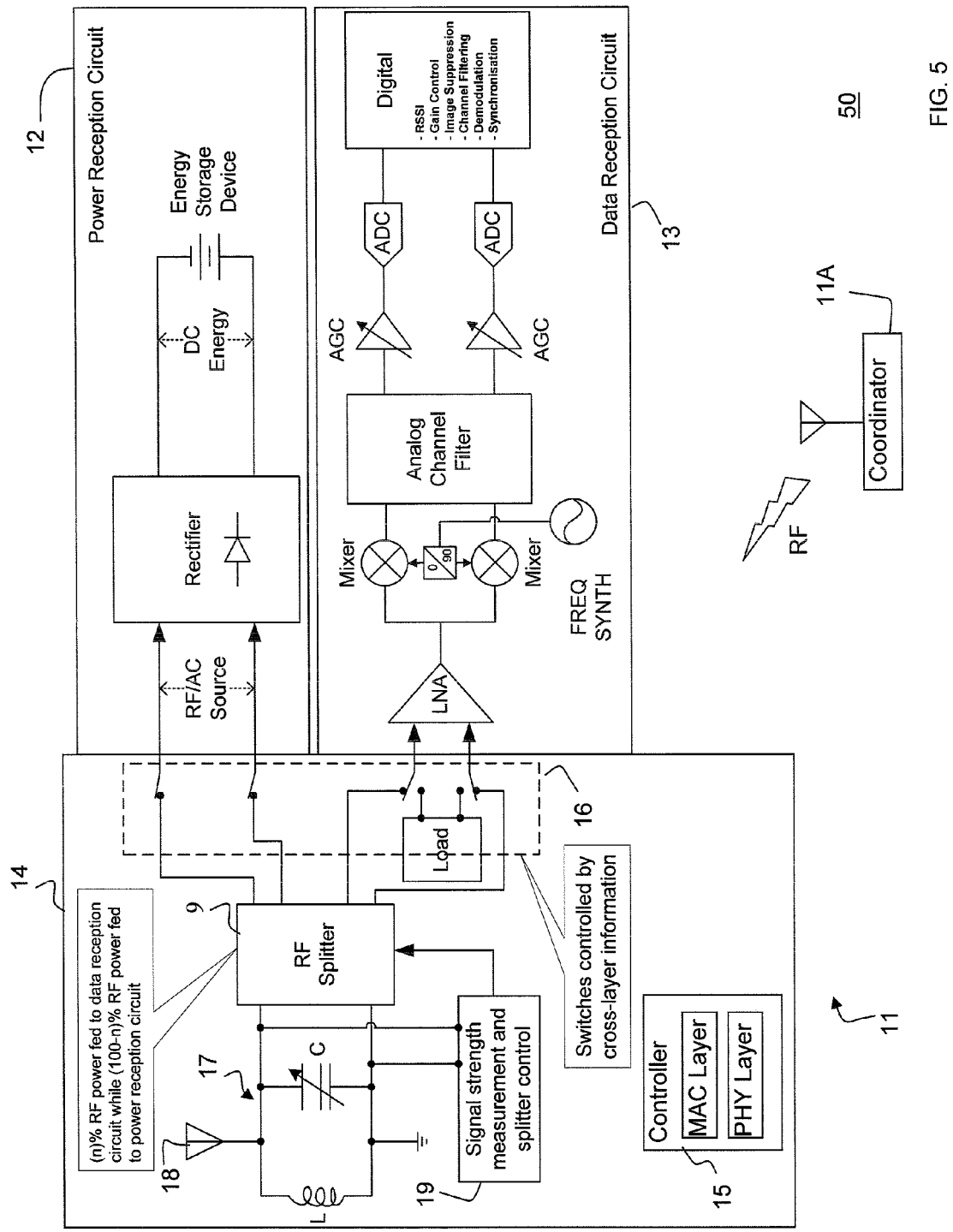
FIG. 5 shows a functional block diagram of a wireless device implementing selectively and adaptively distributing a percentage of electrical charge from received radio frequency (RF) radiation distributing to a data receiving circuit and a remainder of that electrical charge to a charge storage unit in a power receiving circuit of the wireless device, using received radio frequency (RF) radiation, according to an embodiment of the invention.

FIG. 5 shows an example communication system 50 including a wireless node 11 wherein switch 16 is controlled by the cross-layer information to be in data reception mode, and the RF splitter 9 is controlled by the signal strength measurement and control module 19 to cause n % of received RF power to be distributed to the data reception circuit 13 and (100−n %) of the power to be distributed to the power reception circuit 12, wherein 100>n>0. As such, received RF power is shared between the power reception circuit 12 and the data reception circuit 13. The ratio of the sharing is determined by the preset threshold which is in turn determined by the receiver sensitivity (as described above).

The signal strength measurement and splitter control module 19 may be separated into two modules, one of which measures received RF signal strength, and another which compare the measured RF signal strength to said preset threshold and determines whether or not the splitter 9 should split the received the RF power between the data and power circuits and at what ratio (if the decision is to split). This decision signal is then sent to the RF splitter 9 to perform power splitting operations accordingly.

In one implementation, the RF splitter 9 is capable of splitting the input RF power signal to two outputs at any ratio between 0-100% or at a series of preset ratios. When one splitter output is at 0% of the input power and the other splitter output is at 100% of the input power, the splitter can be considered bypassed such that the circuit at the 100% output of the splitter can be considered connected directly to the input power from the LC circuit 17.

Figure 6:
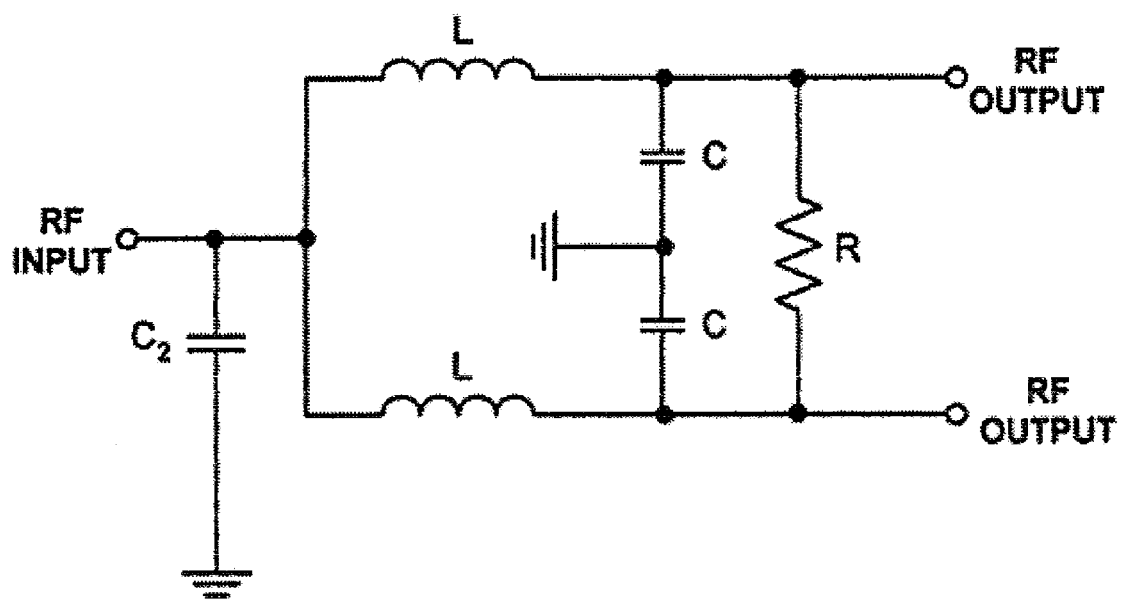
FIG. 6 shows a schematic of an example RF splitter.

As shown by example in FIG. 6, the RF splitter 9 is a circuit used to split a signal linearly. For an RF splitter, a signal is placed at the input, and two or more signals are removed from two or more separate ports at the output. The outputs can be of equal or different amplitudes and phases. The figure illustrates an LC power 0 degree splitter.

In one embodiment, the present invention is useful with wireless devices with multiple antennas (e.g., multiple-input-multiple-output), wherein all antennas are used for either data communication or power communication (i.e., power transmission/reception) at any moment, but not simultaneously. In another embodiment, the present invention is useful with wireless devices with multiple antennas, wherein one or more antennas are used for data communication while one or more other antennas are used for power transmission/reception. The multiple antennas can operate for one function at a time (e.g., for data communication or power transmission/reception), or simultaneously work for both functions (one or more antennas for data communications and one or more other antennas for power transmission/reception).

The invention further provides transmitting electrical charge to a charge storage unit of a device, and information delivery to the same device, using radio frequency (RF) radiation. One embodiment provides a process for cross-layer control of RF power transmission in an RF wireless network. The control process allows both wireless communication and power transmission using a single, common antenna. The control signals enable the integrated wireless power and data transmission module to operate in a wireless network such as a network having a star or mesh (i.e., peer-to-peer) topology.

The control signals represent control information enabling devices (e.g., wireless stations or nodes) that include an integrated wireless power and data transmission module, to switch between a power receiving mode and a data communication mode (i.e., power mode switching). In one example star communication network, a coordinator station (or master device) is the power transmitter as well as the central controller of the communication network. Beacon frames transmitted by the coordinator are utilized by receiving devices in the network to control the timing of switching between power receiving mode and data communication mode. In a mesh network, because there is no coordinator/master device, the devices in the network are charged by data transmissions occurring in their neighborhood and/or other devices scattered in the network. Said control signals enable the receiving devices in a network to determine when to switch modes (between power receiving mode and data communication mode), and which mode to switch to. This allows the receiving devices to avoid conflict between energy reception and data communication, and to thereby avoid missing data messages from other devices.

In one example, this allows charging the rechargeable batteries of wireless nodes in a star or mesh topology network. A node may recharge its batteries by receiving power transmission from the coordinator or master device in a star network, or overhearing (receiving) data transmissions among other nodes in a mesh network and using such received data transmissions as power transmissions, or receiving power transmissions from mains powered neighbor devices (e.g., devices powered by electric power from an AC outlet, which may be converted to DC power first) in a mesh network. As noted, in a star network, beacon frames from a coordinator are used to control the timing of switching between the data communication and power transmission modes at a each node in the network. In a mesh network, a RTS/CTS (Request To Send/Clear To Send) protocol may be utilized to establish the timing for switching between the two modes. Further, an inter-frame guard time is implemented as a power inter-frame space (PIFS), to allow mains powered devices to charge battery powered devices in mesh networks.

The central controller in the network may provide a communication schedule (superframe structure) which device(s) 11 utilize to transmit or receive data at a given time period via one or more wireless communication channels.

A star topology coordinator (or master) does not require RF power reception functionality because a coordinator is a power transmitter and does not require RF power. The coordinator is typically mains powered and does not require a power reception circuit. In mesh topology, the coordinator should be able to receive RF power as such mesh coordinator may not be mains powered. The coordinator determines a superframe structure for access to a shared channel. Once a wireless device 11 (wireless station) is informed of the superframe structure (by listening to beacons), the wireless device can switch between data receiving mode and power receiving mode accordingly. Each device 11 determines when to switch based on the information obtained from the beacons it receives from the coordinator.

The interface 14 in each device 11 controls the switches 16 according to the communication schedule determined at the MAC layer, such that the interface 14 switches the device 11 to one of the two modes specified by the control signals, at a time (and for a duration) specified by the control signals. The functionality of controlling the switches 16 may be implemented in a MAC layer of each device 11.

In most cases, communications between any two devices 11 may need to be relayed by the coordinator 11A, even when the two devices 11 are within the communication range of one another (so-called indirect communication). When applying wireless power transmission to a network according to an embodiment of the invention, it is assumed that the coordinator 11A is mains powered and is able to transmit power to devices 11 when the coordinator 11A is not transmitting data. Furthermore, when the coordinator 11A transmits data to a selected device 11, one or more of non-selected devices 11 may switch to power reception mode and treat the data transmission from the coordinator 11A to the selected device as a power source. As such, for the same data transmission, the selected device receives the transmission from the coordinator as data while the non-selected devices receive the same transmission as energy to recharge their batteries, for example.

In one embodiment, an IEEE 802.15.4 (LR-WPAN) communication standard is used for a star network. The LR-WPAN standard can operate in a totally unarranged mode (contention-based slotted CSMA/CA) or optionally under a superframe structure. For wireless power transmission, in a preferred embodiment, a superframe is defined by the coordinator 11A, which in this example, is also the power transmitter. Each superframe begins at a beacon, wherein the beacons are transmitted by the coordinator 11A. The superframe is divided into multiple equally sized time slots. A beacon is transmitted in the first slot of each superframe.

For a personal area network (PAN), the beacons are used to synchronize the devices 11, to identify the scheduled PAN devices 11, and to describe the structure of the superframes. Any device 11 wishing to communicate during a contention access period (CAP) between two beacons competes with other devices 11 using a slotted CSMA-CA mechanism. All transmissions scheduled during a current superframe need to be completed by the time of the next network beacon. For low-latency applications or applications requiring specific data bandwidth, the PAN coordinator 11A may dedicate certain slots of the active superframe to such applications. Such slots are termed guaranteed time slots (GTSs). The GTSs form a contention-free period (CFP), which always appears at the end of the active superframe starting at a slot boundary immediately following the CAP. The PAN coordinator may allocate up to seven GTSs, and a GTS may occupy more than one slot period. When GTS is used, all contention-based transactions need to be completed before the CFP begins. Further, each device 11 transmitting in a GTS needs to ensure that its transaction is complete before the time of the next GTS or the end of the CFP.

The superframe may include active and inactive periods. An active period may include a CAP and a CFP. In existing systems, both the coordinator 11A and the PAN devices 11 may enter a low-power mode during the inactive period. When the coordinator is used for wireless power transmission, the coordinator transmits power to the PAN devices during the inactive period because then no devices 11 transmit or receive any data during such periods.

In a network with star topology there are two types of data transactions. One is data transfer to a coordinator in which a device transmits the data, and the other is data transfer from a coordinator in which a device receives the data. Direct data exchange between two devices is not allowed in star topology of LR-WPAN.

When a wireless device wishes to transfer data to a coordinator in a beacon-enabled network, the device first detects the network beacon. When the beacon is detected, the device synchronizes to the superframe structure. At the appropriate point, the device transmits a data frame to the coordinator using slotted CSMA-CA. The coordinator acknowledges successful reception of the data frame by transmitting an optional acknowledgment frame. That transaction is now complete.

When the coordinator wishes to transfer data to a device in a beacon-enabled network, the coordinator indicates in beacon that data message is pending. The device periodically listens to the network beacon and, if a message is pending, the device transmits a MAC command requesting the data, using slotted CSMA-CA. The coordinator acknowledges successful reception of the data request by transmitting an optional acknowledgment frame. The pending data frame is then transmitted from the coordinator to the device using slotted CSMA-CA. The device acknowledges successful reception of the data by transmitting an acknowledgment frame. The transaction is now complete. Upon receiving the acknowledgement, the message is removed from the list of pending messages in the beacon.

According to an embodiment of the present invention, if the GTS in the superframe is not used, the coordinator 11A does not transmit pure power (RF waveform without carrying any information) before the CAP ends, even when there is no data to send to the devices 11. This is because the devices 11 may have data to send to the coordinator 11A, and as such the coordinator 11A remains in data communication mode. If the GTS is used, the coordinator 11A extends its stay in the data communication mode until the communication in the GTS slots ends. Even when the coordinator 11A is not transmitting power, one or more devices 11 can receive power from data communications between the coordinator 11A and other devices 11, as long as said one or more devices are in power reception mode.

The devices 11 periodically listen for beacons in the data communication mode. If upon detecting a beacon a device 11 determines that it has a message pending from the coordinator (carried by the beacon payload field), the device follows a usual standard to retrieve the data from the coordinator during the superframe period starting at a detected beacon. After receiving the data, the device 11 can switch to power receiving mode if it has no data to send to the coordinator during this superframe period. Otherwise, according to the invention, the device 11 first sends the data to the coordinator 11A and then switches to the power receiving mode. Once switched to the power receiving mode, the device 11 stays in that mode until just before the next beacon time.

If the device 11 detects that it does not have messages pending from the coordinator, the device 11 can switch to power receiving mode immediately if it has no data to send to the coordinator during this superframe period. Otherwise, the device first sends the data to the coordinator and then switches to the power receiving mode. Once switched to the power receiving mode, the device 11 stays in that mode until just before the next beacon time. If GTS slots in a superframe are assigned for a device 11, the device stays in the data communication mode until it finishes the data communication using GTS slots. The device 11 can then switch to a power receiving mode.

When GTS slots are not used, the coordinator 11A stays in the communication mode until the CAP ends. After CAP, the coordinator 11A can start transmitting pure power until the end of the inactive period.

Figure 7A:
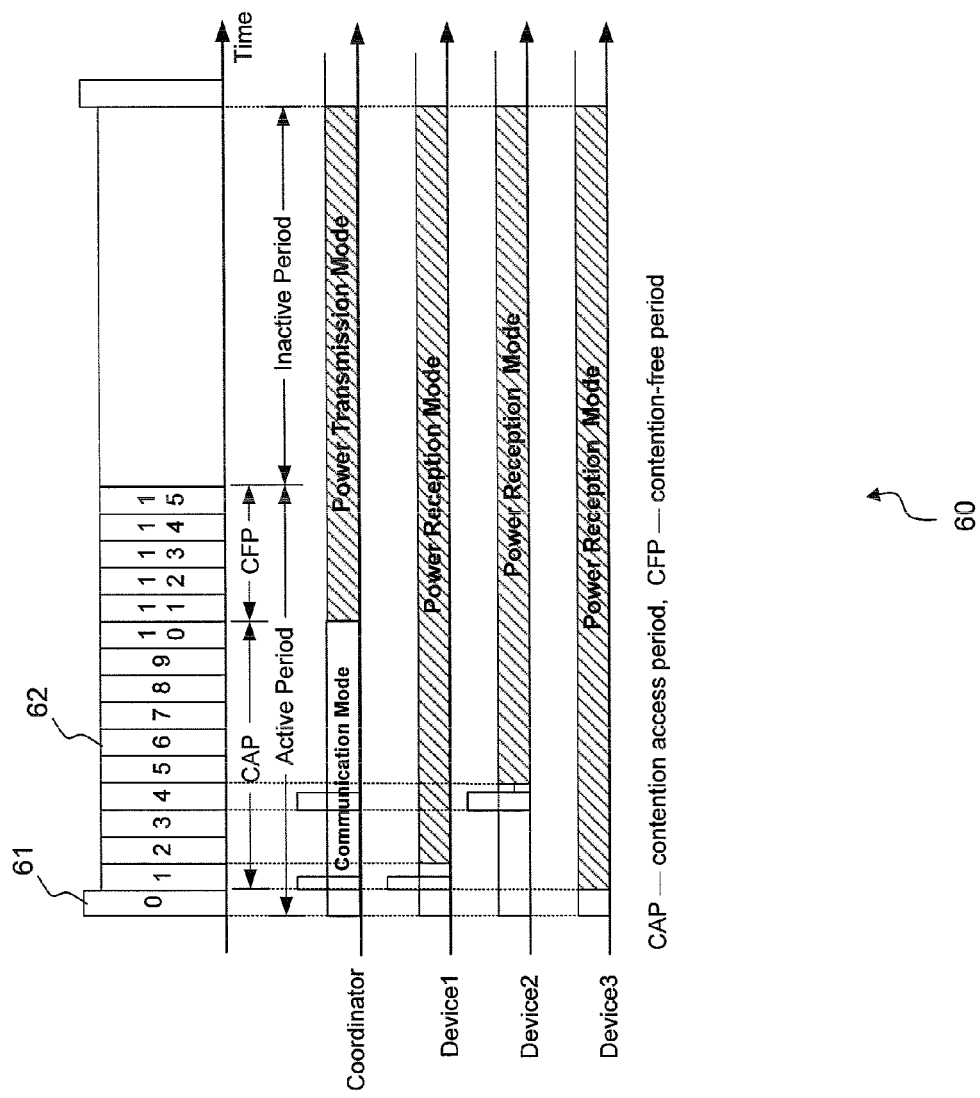
FIG. 7A shows a superframe scheduling format for data and power transmission without use of guaranteed time slots (GTS) for access to a shared wireless communication medium, according to an embodiment of the invention.

In a first example scenario shown in FIG. 7A, an example superframe 60 for data and power transmission without use of GTS slots, according to an embodiment of the invention. The format of the superframe 60 is defined by the coordinator, which in this example, is also a power transmitter. Each superframe 60 begins at a beacon 61, wherein the beacons are transmitted by the coordinator. In this example the superframe 60 is divided into sixteen equally sized time slots 62. A beacon 61 is transmitted in the first slot of each superframe.

When GTS slots are not used, the coordinator stays in the communication mode until the CAP ends. After CAP, the coordinator can start transmitting pure power until the end of the inactive period. If a Device 11-1 among devices 11 has data to send to the coordinator and has no data to receive from the coordinator, and slot1 of the superframe 60 is used for transmission, then at the end of slot1 the Device11-1 can switch to the power reception mode. If a Device11-2 among devices 11 has a data message from the coordinator and has no data to send to the coordinator, and slot4 is used to retrieve the data from the coordinator, then at the end of slot4, the Device11-2 can switch to the power reception mode. If a Device11-3 among devices 11 has no data to send to the coordinator and no data to receive from the coordinator, then Device11-3 can switch its receiver circuitry to power reception mode immediately after the beacon message is received and checked by the Device11-3.

Between slot0 and slot10, the coordinator remains in the data communication mode. However, devices 11 are able to receive power from transmissions of each other. For example, in slot1, when Device11-1 is transmitting, Device11-3 may be able to receive the data message transmission. Since Device11-3 is in the power reception mode in the same time period, the Device11-3 treats the received RF signal as power transmission and uses it to charge its energy storage device. As another example, in slot4, when the coordinator is transmitting data to the Device11-2, both Device11-1 and Device11-3 are in the power reception mode, whereby they can receive and store the energy of the transmission. The contention access period (CAP) in CSMA/CA need not be slotted while CFP is slotted. The operation when the CAP is not slotted is similar to the case when it is slotted. In some cases CAP is also slotted, and in these cases, it is called slotted CSMA/CA. The CSMA/CA has been described in this example as being slotted. However, those skilled in the art will recognize that invention is useful with non-slotted CSMA/CA as well.

Figure 7B:
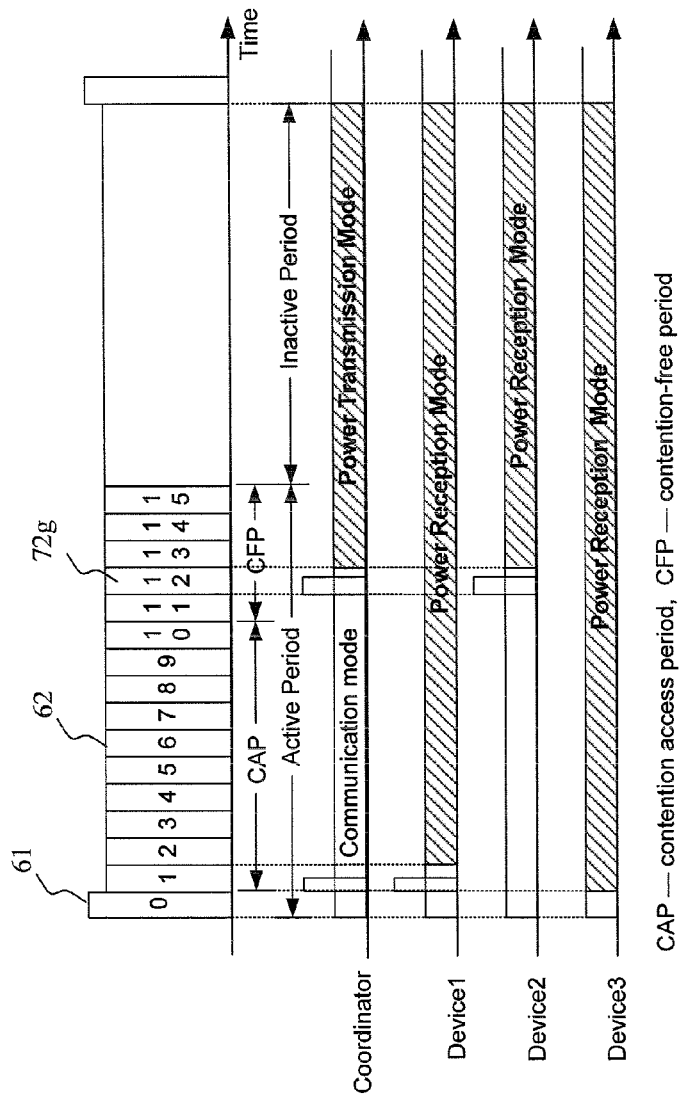
FIG. 7B shows a superframe scheduling format for data and power transmission using one or more GTSs for access to a wireless communication medium, according to an embodiment of the invention.

In a second scenario with a superframe 70 shown in FIG. 7B, for data and power transmission, having GTS slots 72g in a CFP after a CAP, if one or more devices use GTS slots 72g, the coordinator stays in the communication mode until the communication in the GTS slots end. Thereafter, the coordinator can start transmitting pure power until the end of the inactive period.

If Device11-1 has data to send to the coordinator during CAP, and slot1 of the superframe 70 is used for that transmission, then at the end of slot1 the Device11-1 can switch to the power reception mode (same as in superframe 60 in FIG. 7A). If Device11-2 has a data message from the coordinator a GTS slot (e.g., slot12) is assigned for retrieving that message from the coordinator. Only at the end of slot 12 can the Device11-2 switch to the power reception mode. The Device 11-3 operates in similar fashion as that in superframe 60.

Optionally, in superframe 70 the Device11-2 can switch to power reception mode during the CAP and then switch back to the communication mode before slot12 if it has nothing to send to the coordinator during the CAP. However, since the coordinator is not sending power during the CAP, the Device11-2 can only receive power from other devices 11 or the coordinator when they transmit data.

The Device11-2 may utilize certain information to determine whether it should switch to power reception mode during the CAP. For example, the Device11-2 can check the beacon payload for a pending address list to determine the number of devices which need to communicate data with the coordinator. If that number is non-zero, then the Device11-2 may switch to power reception mode to utilize RF energy of at least several transmissions between the coordinator and the other devices.

In one example mesh network (peer-to-peer network), all devices 11 in the network are battery powered, while in another example one or more devices 11 in the network are mains powered. As noted, in a mesh network a coordinator function is not utilized. All devices in the network are equal so far as data communication is concerned. Data may be exchanged between any two devices on the network without the presence of a coordinator. The devices 11 implement functionality of said controller 15 (FIG. 3), by utilizing a communication protocol that determines which device(s) 11 may transmit or receive data at a given time period via one or more wireless communication channels. The interface 14 in each device 11 controls the switches 16 according to the communication schedule. The functionality of controlling the switches 16 may be implemented in a MAC layer of each device 11.

A GTS mechanism is not utilized, rather either beacon-enabled (with superframe structure) or non-beacon-enabled (without superframe structure) protocols may be used. For a beacon-enabled mesh network, communication of data is scheduled such that the approach described earlier for star network may also be applied, according to an embodiment of the invention.

For a non-beacon mesh network, every device may communicate with every other device in its radio sphere of influence. For effective communication, in a synchronous wireless mesh network the devices either synchronize with each other (including using beacons), or in an asynchronous wireless mesh network the devices can receive data whenever it is sent. In the former case, synchronization is required, wherein in one example, devices manage their schedules for data communication and power reception, in a similar fashion described above. In the latter case (i.e., asynchronous wireless mesh network), the devices can simply transmit data using unslotted CSMA-CA, but their data communication circuits (transceivers) remain on.

In an asynchronous wireless mesh network, wherein all the devices in the network are battery powered, the only power sources are the RF data transmissions from neighbor devices. In such a network, data communications may occur randomly, therefore transmission of pure power must be scheduled. Further, pure power transmission in adjacent bands is not favorable because adjacent bands in use by other networks may be jammed. However, a device can receive RF power from neighboring devices when they are transmitting, if that device selectively switches between data communication and power reception modes. In one example, a request to send (RTS)/clear to send (CTS) protocol is utilized to implement switching to power reception mode in the network. RTS/CTS reduces frame collisions introduced by the hidden terminal problem and exposed device problem, such as in IEEE 802.11 wireless communication).

In the RTS frame, a Duration value is the time period required (in microseconds) to transmit pending data or management frame, one CTS frame, one ACK frame, and three short inter-frame space (SIFS) intervals. The RA (receiver address) of the RTS frame is the address of the device that is the recipient of the pending directed data or management frame. The TA (transmitter address) is the address of the device transmitting the RTS frame.

In the CTS frame, a Duration value is the value obtained from the Duration field of the immediately previous RTS frame, minus the time period required to transmit the CTS frame and its SIFS interval. The RA of the CTS frame is copied from the TA field of the immediately previous RTS frame to which the CTS is a response.

A sender device wishing to send data to a destination (target) receiver device initiates the process by sending an RTS frame. The destination device replies with a CTS frame. Any other device receiving the CTS frame refrains from sending data for a given time period (addressing the hidden device problem). The amount of time a device should wait before attempting to access the communication medium (e.g., wireless RF channel) is included in both the RTS and the CTS frames (i.e., in the Duration fields). Any other device receiving the RTS frame, but not the CTS frame, is permitted to transmit to other neighboring devices (addressing the exposed node problem).

RTS and CTS frames provide the remaining network devices (i.e., devices other than the data sender and receiver devices), with information including:

Only a specified device (i.e., sender device) will transmit during a reserved channel time period.
The other devices cannot transmit because a device has reserved the channel.
The other devices are not the destination for said transmission (e.g., a data packet) during the reserved period.
The length of the reserved transmission time.
During the reserved transmission time, other devices will not receive any data frames destined to them from other nodes.

Therefore, said remaining devices may switch to power reception mode to receive power from the transmission by the data sender. Only devices that received the RTS frame can receive the power transmitted by the sender device. Those nodes only receiving the CTS cannot receive the transmission.

As such, according to the invention, two types of control signals may be used for power mode switching. The first type is beacon signals generated at the MAC layer of a coordinator station and received at the MAC layer of the receiving stations for power mode switching. The second type is RTS/CTS control frames that are exchanged between the sending station and receiving stations, described herein below.

Using RTS/CTS frames and a network allocation vector (NAV) indicator, a NAV indicator, maintained by each device, indicates those time periods when transmission onto the communication medium (e.g., wireless medium (WM)) will not be initiated by a device, whether or not a clear channel assessment (CCA) function of the device senses that the wireless medium is busy. Because the devices are not to transmit while they are in the NAV, all devices receiving the RTS frame immediately enter the NAV period. There will not be any devices that transmit during the NAV except the sender source of the RTS frame. Therefore, all devices receiving the RTS can switch to power reception mode, and need not be concerned with missing any data communication. By switching to the power reception mode during the NAV period, the devices can be charged by data transmission of other devices.

In an asynchronous wireless mesh network, wherein one or more devices in the network are battery powered while one or more other devices are mains powered (i.e., mixed-power network), the mains powered devices transmit power to battery powered devices when no devices are transmitting data in the neighborhood. In an example mixed-powered mesh network, one or more devices are mains powered and the rest are battery powered.

To prevent battery powered devices from transmitting data packets during power transmission, the communication medium is reserved for power transmission, while preserving priority of data communication over power transmission. A power inter-frame space (PIFS) interval is implemented, wherein the PIFS interval is longer than the distributed inter-frame space (DIFS) interval such that the RTS frame for power transmission is always sent when no RTS frame for data transmission is received after the previous data communication in the neighborhood.

Figure 8:
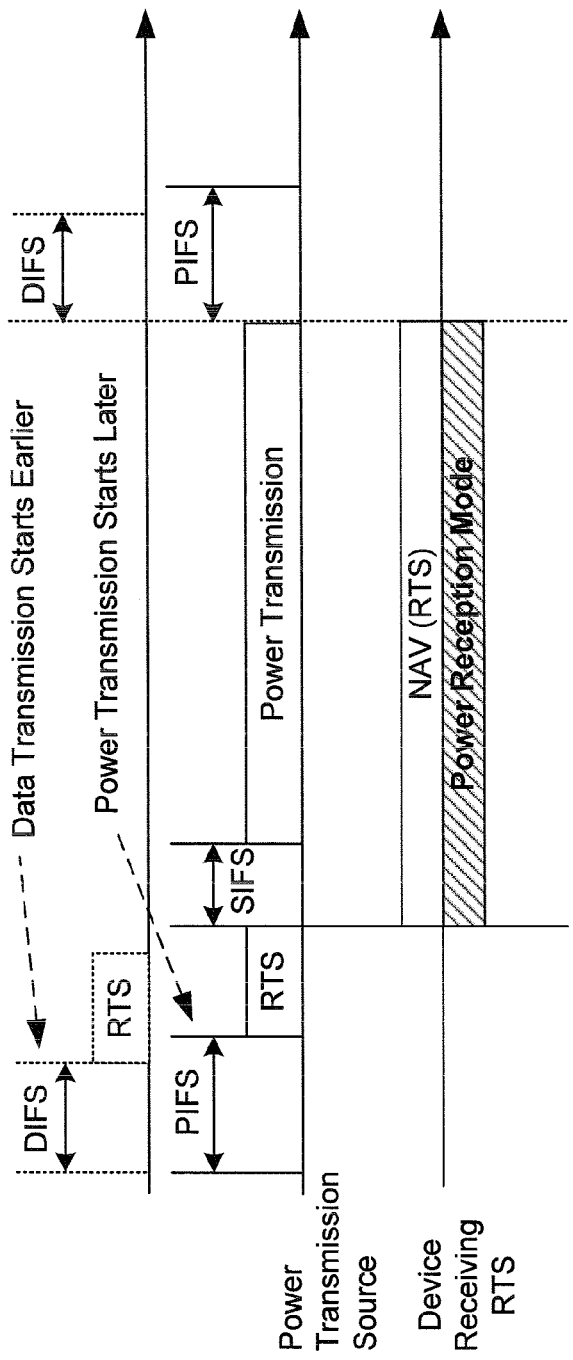
FIG. 8 shows a communication protocol using RTS/CTS frames and a NAV indicator for power reception in a mesh network, according to an embodiment of the present invention.

Referring to the example protocol 95 in FIG. 8, in one implementation according to the invention, the power transmitter (source) may wait for a time period slightly longer than the DIFS interval before it transmits the RTS frame for power transmission. The above protocol 95 only applies to the power transmitter and not to other battery powered devices.

The format for the RTS frame is modified to reflect the fact that it is different from that in normal data transmissions. In one implementation, a broadcast address 0xffff for the RA field in the RTS frame is used. When other devices receive an RTS frame with a broadcast address as RA, the receiving devices recognize the RTS frame as a reservation for power transmission. The receiving devices hence do not reply with a CTS frame and the sender device (mains powered device) for the RTS frame does not expect to receive a CTS frame in that case.

When the duration of NAV (i.e., the duration of power transmission) ends, all devices start the carrier sensing process again. If, during a previous NAV period, one or more devices desired to transmit data, such devices can compete for the communication medium at the end of the NAV. If there is no data from any devices, the mains powered device can transmit power again after waiting for a PIFS interval.

Because data transmission and power transmission cannot be performed at the same time, it is important to balance the amount of energy transmitted and the latency of the data packets. A long power transmission period may delay data transmission. A short power transmission period may result in devices frequently switching between data transmission and power transmission mode to recharge their batteries, resulting in overhead and more power consumption in switching.

One approach to determine the interval and duration of power transmission is to determine the traffic pattern in the neighborhood, according to an embodiment of the invention. If the traffic pattern is very regular (e.g., in a sensor network where devices update the information periodically), the mains powered device can estimate the time period when the probability of data transmission is very low and use it to transmit power. In a neighborhood with irregular traffic pattern, the mains powered device may analyze the average data transmission time and the minimum/maximum interval between data transmissions, achieving informed selection for the duration of power transmission.

The present invention is suitable for different networks, and not limited to WPAN, WLAN and other standards mentioned in the description herein. As is known to those skilled in the art, the aforementioned example architectures described above, according to the invention, can be implemented in many ways, such as program instructions for execution by a processor, as software modules, microcode, as computer program product on computer readable media, as logic circuits, as application specific integrated circuits, as firmware, etc. Further, embodiments of the invention can take the form of an entirely hardware embodiment, an entirely software embodiment or an embodiment containing both hardware and software elements.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor multi-core processor to perform the features of the computer system. Accordingly, such computer programs represent controllers of the computer system.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Though the present invention has been described with reference to certain versions thereof; however, other versions are possible. Therefore, the spirit and scope of the appended claims should not be limited to the description of the preferred versions contained herein.

What is claimed is:

1. A method of integrated wireless power and data transmission, the method comprising, in a wireless device comprising a data communication circuit for wireless data communication and a power reception circuit including a charge storage unit:
   tuning to receive wireless RF signals in a certain frequency band via an antenna;
   a switching mode that includes switching between power reception mode and data communication mode; and
   selectively distributing received RF signal electrical charge to the power reception circuit and/or the data communication circuit based on the switching mode and/or strength of the RF signal, wherein distributing received RF signal electrical charge is adaptive as a function of at least one of switching mode and strength of the RF signal.

2. The method of claim 1 wherein selectively distributing received RF signal electrical charge further comprises, in power reception mode distributing received RF signal electrical charge to the power reception circuit only to charge the charge storage unit.

3. The method of claim 2 further including turning the data communication circuit off.

4. The method of claim 2 wherein selectively distributing received RF signal electrical charge further comprises, in data communication mode:
  determining strength of the RF signal; and
    if the RF signal strength is less than a threshold, then distributing the RF signal electrical charge to the data communication circuit only to operate the data communication circuit.

5. The method of claim 4 further including turning the power reception circuit off.

6. The method of claim 4 wherein selectively distributing received RF signal electrical charge in data communication mode further comprises:
  if the RF signal strength is greater than a threshold, then splitting distribution of the RF signal electrical charge between the data communication circuit and the power reception circuit.

7. The method of claim 6 wherein in data communication mode splitting distribution of the RF signal electrical charge further comprises splitting distribution of the RF signal electrical charge between the data communication circuit and the power reception circuit such that received RF signal electrical charge in excess of data communication circuit operational needs is distributed to the power reception circuit to charge the charge storage unit.

8. The method of claim 1 further comprising:
  generating control signals for switching the wireless device between a power reception mode and a data communication mode, the control signals providing switching information including information about which of the modes to switch to, and information about timing of the switching;
  wherein in the data communication mode, the wireless device processes an RF transmission from a sending wireless device as a data communication, and in the power reception mode the receiving wireless device processes the RF transmission as energy radiation.

9. The method of claim 1 wherein the wireless device comprises multiple antennas, such that one or more of the multiple antennas are used for data communication while one or more other antennas of the multiple antennas are used for power transmission/reception, simultaneously.

10. The method of claim 1 wherein the wireless device comprises multiple antennas, such that the multiple antennas operate for data communication or power transmission/reception, at a time.

11. The apparatus of claim 10 wherein the split control module is further configured for, in power reception mode, distributing received RF signal electrical charge to the power reception circuit only to charge the charge storage unit.

12. The apparatus of claim 11 further comprising a power control module configured for turning the data communication circuit off.

13. The apparatus of claim 11 further comprising a signal strength detector configured for detecting the strength of the received RF signal, wherein the split control module is further configured for, in data communication mode, if the RF signal strength is less than a threshold, then distributing the RF signal electrical charge to the data communication circuit only to operate the data communication circuit.

14. The apparatus of claim 13 further comprising a power control module configured for turning the power reception circuit off.

15. The apparatus of claim 13 wherein the split control module is further configured for, in data communication mode, if the RF signal strength is greater than a threshold, then splitting distribution of the RF signal electrical charge between the data communication circuit and the power reception circuit.

16. The apparatus of claim 15 wherein the split control module is further configured for, in data communication mode, splitting distribution of the RF signal electrical charge between the data communication circuit and the power reception circuit such that received RF signal electrical charge in excess of data communication circuit operational needs is distributed to the power reception circuit to charge the charge storage unit.

17. The method of claim 1, wherein transmission power of the wireless RF signals comprises radio waves.

18. The method of claim 1, wherein upon the RF data signal being greater than a selected threshold based on sensitivity of the data communication circuit, the RF splitter distributes the received energy between the power reception circuit and the data communication circuit.

19. The method of claim 18, wherein received RF power in excess of operation of the data communication circuit requirements is used for charging the charge storage unit.

20. The method of claim 1, wherein distributing received RF signal electrical charge is adaptive based on strength of the received RF signal and power requirement of the data communication circuit.

21. An apparatus for integrated wireless power and data transmission using radio frequency (RF) signals in a wireless network, comprising:
  a tuner for tuning to receive wireless RF signals in a certain frequency band via an antenna;
  a detection module configured for a switching mode that includes switching between power reception mode and data communication mode; and
  a split control module configured for selectively distributing received RF signal electrical charge to a power reception circuit and/or a data communication circuit based on the switching mode and/or strength of the RF signal, wherein distributing received RF signal electrical charge is adaptive as a function of at least one of switching mode and strength of the RF signal.

22. The apparatus of claim 21 further comprising:
  a controller function configured for generating control signals for switching the wireless device between a power reception mode and a data communication mode, the control signals providing switching information including information about which of the modes to switch to, and information about timing of the switching;
  wherein in the data communication mode, the receiving wireless device processes an RF transmission from a sending wireless device as a data communication, and in the power reception mode the receiving wireless device processes the RF transmission as energy radiation.

23. A wireless device, comprising:
  a data communication circuit for wireless data communication;
  a power reception circuit including a charge storage unit;
  an interface module configured for integrated wireless power and data transmission using radio frequency (RF) signals in a wireless network, comprising:
    a tuner for tuning to receive wireless RF signals in a certain frequency band via an antenna;
    a detection module configured for a switching mode that includes switching between power reception mode and data communication mode; and
    a split control module configured for selectively distributing received RF signal electrical charge to the power reception circuit and/or the data communication circuit based on the switching mode and/or strength of the RF signal, wherein distributing received RF signal electrical charge is adaptive as a function of at least one of switching mode and strength of the RF signal.

24. The wireless device of claim 23 wherein:
the split control module is further configured for, in power reception mode, distributing received RF signal electrical charge to the power reception circuit only to charge the charge storage unit.

25. The wireless device of claim 24 further comprising a signal strength detector configured for detecting the strength of the received RF signal, wherein the split control module is further configured for, in data communication mode, if the RF signal strength is less than a threshold, then distributing the RF signal electrical charge to the data communication circuit only to operate the data communication circuit.

26. The wireless device of claim 25 wherein the split control module is further configured for, in data communication mode:
if the RF signal strength is greater than a threshold, then splitting distribution of the RF signal electrical charge between the data communication circuit and the power reception circuit, such that received RF signal electrical charge in excess of data communication circuit operational needs is distributed to the power reception circuit to charge the charge storage unit.

27. The wireless device of claim 26 further comprising:
a wireless communication stack cross-layer function configured for generating control signals for switching the wireless device between a power reception mode and a data communication mode, the control signals providing switching information including information about which of the modes to switch to, and information about timing of the switching;
wherein in the data communication mode, the receiving wireless device processes an RF transmission from a sending wireless device as a data communication, and in the power reception mode the receiving wireless device processes the RF transmission as energy radiation.

28. A wireless communication system for radio frequency (RF) power transmission, comprising:
multiple wireless devices configured for forming a wireless network;
a wireless communication stack cross-layer function configured for generating control signals for switching each wireless device between a power reception mode and a data communication mode, the control signals providing switching information including information about which of the modes to switch to, and information about timing of the switching, wherein in the data communication mode, the receiving wireless device processes an RF transmission from a sending wireless device as a data communication, and in the power reception mode the receiving wireless device processes the RF transmission as energy radiation;
one of the wireless devices comprising:
a data communication circuit for wireless data communication;
a power reception circuit including a charge storage unit;
an interface module configured for integrated wireless power and data transmission using radio frequency (RF) signals in a wireless network, comprising:
a tuner for tuning to receive wireless RF signals in a certain frequency band via an antenna;
a detection module configured for a switching mode that includes switching between power reception mode and data communication mode; and
a split control module configured for selectively distributing received RF signal electrical charge to the power reception circuit and/or the data communication circuit based on the switching mode and/or strength of the RF signal, wherein distributing received RF signal electrical charge is adaptive as a function of at least one of switching mode and strength of the RF signal.

29. The system of claim 28 wherein:
the split control module is further configured for, in power reception mode, distributing received RF signal electrical charge to the power reception circuit only to charge the charge storage unit.

30. The system of claim 29 further comprising a signal strength detector configured for detecting the strength of the received RF signal, wherein the split control module is further configured for, in data communication mode:
if the RF signal strength is less than a threshold, then distributing the RF signal electrical charge to the data communication circuit only to operate the data communication circuit.

31. The system of claim 30 wherein the split control module is further configured for, in data communication mode:
if the RF signal strength is greater than a threshold, then splitting distribution of the RF signal electrical charge between the data communication circuit and the power reception circuit, such that received RF signal electrical charge in excess of data communication circuit operational needs is distributed to the power reception circuit to charge the charge storage unit.

* * * * *